(12) United States Patent
Thomas et al.

(10) Patent No.: US 7,571,159 B2
(45) Date of Patent: Aug. 4, 2009

(54) SYSTEM AND METHOD FOR BUILDING DECISION TREE CLASSIFIERS USING BITMAP TECHNIQUES

(75) Inventors: Shiby Thomas, Nashua, NH (US); Wei Li, San Carlos, CA (US); Joseph Yarmus, Groton, MA (US); Mahesh Jagannath, Shrewsbury, MA (US); Ari W. Mozes, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 235 days.

(21) Appl. No.: 11/344,193

(22) Filed: Feb. 1, 2006

(65) Prior Publication Data

US 2007/0192341 A1    Aug. 16, 2007

(51) Int. Cl.
*G06F 7/00* (2006.01)
*G06F 17/30* (2006.01)
*G06F 17/00* (2006.01)
(52) U.S. Cl. ........................................ 707/3; 707/104.1
(58) Field of Classification Search ........................ None
See application file for complete search history.

(56) References Cited

U.S. PATENT DOCUMENTS 7,249,149 B1 *  7/2007  Eatherton et al. ......... 707/104.1

2005/0050016 A1 *  3/2005  Stanoi et al. .................... 707/3

OTHER PUBLICATIONS

Cecile Favre et al. Bitmap Index-Based Decision Trees, May 2, 2005, Springer Berlin / Heidelberg, vol. 3488/2005, pp. 65-73, (http://www.springerlink.com/content/u0r8qvkpwa2wu8k6/fulltext.pdf).*

* cited by examiner

*Primary Examiner*—Mohammad Ali
*Assistant Examiner*—Alexey Shmatov
(74) *Attorney, Agent, or Firm*—Hanify & King, P.C.

(57) ABSTRACT

A method, system, and computer program product for counting predictor-target pairs for a decision tree model provides the capability to generate count tables that is quicker and more efficient than previous techniques. A method of counting predictor-target pairs for a decision tree model, the decision tree model based on data stored in a database, the data comprising a plurality of rows of data, at least one predictor and at least one target, comprises generating a bitmap for each split node of data stored in a database system by intersecting a parent node bitmap and a bitmap of a predictor that satisfies a condition of the node, intersecting each split node bitmap with each predictor bitmap and with each target bitmap to form intersected bitmaps, and counting bits of each intersected bitmap to generate a count of predictor-target pairs.

17 Claims, 11 Drawing Sheets

DECISION TREE

WILL A CUSTOMER RESPOND TO A CREDIT CARD PROMOTION?

| ROW 401 | AGE 1 | INCOME 297 | RESPONSE N | • • • |
| ROW 402 | AGE 2 | INCOME 427 | RESPONSE N | • • • |
| ROW 403 | AGE 3 | INCOME 215 | RESPONSE N | • • • |
| ROW 404 | AGE 1 | INCOME 330 | RESPONSE N | • • • |
| ROW 405 | AGE 5 | INCOME 694 | RESPONSE Y | • • • |
| ROW 406 | AGE 1 | INCOME 486 | RESPONSE N | • • • |
| ROW 407 | AGE 2 | INCOME 195 | RESPONSE N | • • • |
| ROW 408 | AGE 4 | INCOME 376 | RESPONSE N | • • • |
| ROW 409 | AGE 3 | INCOME 700 | RESPONSE Y | • • • |

| BITMAP 450 | AGE | 1 | 100101000... |
| BITMAP 451 | AGE | 2 | 010000100... |
| BITMAP 452 | AGE | 3 | 001000001... |
| BITMAP 453 | AGE | 4 | 000000010... |
| BITMAP 454 | AGE | 5 | 000010000... |

Fig. 5

```
FUNCTION ORA_FI_DECISION_TREE_HORIZ(
        horiz_cursor     IN  SYS_REFCURSOR,
        impurity_metric  IN  VARCHAR2 DEFAULT NULL,
        term_max_depth IN  NUMBER DEFAULT NULL,
        term_minrec_split  IN  NUMBER DEFAULT NULL,
        term_minpct_split  IN  NUMBER DEFAULT NULL,
        term_minrec_node IN  NUMBER DEFAULT NULL,
        term_minpct_node IN  NUMBER DEFAULT NULL,
        cost_matrixIN  SYS_REFCURSOR DEFAULT NULL,
        priors           IN  SYS_REFCURSOR DEFAULT NULL
) RETURN TABLE OF ROW (
        PARENTNODE   NUMBER,
        NODE         NUMBER,
        SPLITNUMBER  NUMBER,
        SPLITVAL_SUPP   NUMBER,
        ATTRNAME     VARCHAR2(30),
        LOWVAL_MEANNUMBER,
        HIGHVAL_DEV_SUPP  NUMBER,
        ATTRVAL_TGTVALVARCHAR2(4000))
```

Fig. 6

```
SELECT *
FROM TABLE(ORA_FI_DECISION_TREE_HORIZ(
   CURSOR(SELECT TO_CHAR(PROMO_SUBCATEGORY),
PROMO_ID,
         PROMO_NAME, PROMO_CATEGORY, PROMO_COST
     FROM PROMOTIONS),
   'TREE_IMPURITY_GINI', 19,0,0,0,0,NULL))
```

Fig. 7

```
BEGIN
 DBMS_DATA_MINING.CREATE_MODEL(
    model_name        => 'DT_model',
    mining_function   => dbms_data_mining.classification,
    data_table_name   => 'promotions',
    case_id_column_name => null,
    target_column_name  => 'promo_subcategory',
    settings_table_name => 'DT_settings');
END;
/
```

SYSTEM AND METHOD FOR BUILDING DECISION TREE CLASSIFIERS USING BITMAP TECHNIQUES

BACKGROUND OF THE INVENTION

1. Field of the Invention

The present invention relates to a method, system, and computer program product for counting predictor-target pairs for a decision tree model that provides the capability to generate count tables that is quicker and more efficient than previous techniques.

2. Description of the Related Art

Data mining is a technique by which hidden patterns may be found in a group of data. True data mining doesn't just change the presentation of data, but actually discovers previously unknown relationships among the data. Data mining is typically implemented as software in, or in association with, database systems. Data mining includes several major steps. First, data mining models are generated by one or more data analysis algorithms. Initially, the models are "untrained", but are "trained" by processing training data and generating information that defines the model. The generated information is then deployed for use in data mining, for example, by providing predictions of future behavior based on specific past behavior.

One important form of data mining model is the decision tree. Decision trees are an efficient form for representing decision processes for classifying entities into categories or constructing piecewise constant functions in nonlinear regression. A tree functions in a hierarchical arrangement; data flowing "down" a tree encounters one decision at a time until a terminal node is reached. A particular variable enters the calculation only when it is required at a particular decision node and only one variable is used at each decision node.

Classification is a well-known and extensively researched problem in the realm of Data Mining. It has found diverse applications in areas of targeted marketing, customer segmentation, fraud detection, and medical diagnosis among others. Among the methods proposed, decision trees are popular for modeling data for classification purposes. The primary goal of classification methods is to learn the relationship between a target attribute and many predictor attributes in the data. Given instances (records) of data where the predictors and targets are known, the modeling process attempts to glean any relationships between the predictor and target attributes. Subsequently, the model is used to provide a prediction of the target attribute for data instances where the target value is unknown and some or all of the predictors are available.

Classification using decision trees is a well-known technique that has been around for a long time. However, the early decision tree algorithms worked well only on small amounts of data and did not scale to large datasets. Most of the well known algorithms for building decision trees, like SLIQ, SPRINT, RainForest, BOAT etc., construct count tables to find splitting attributes and split points. Count tables store record counts for every (predictor value, target value) pairs at every node in the tree. As the build process goes deeper in the tree, constructing these count tables becomes very expensive in terms of computing resources and time. A need arises for a technique by which such counting can be performed more quickly and efficiently.

SUMMARY OF THE INVENTION

The present invention provides the capability to generate count tables in a way that is quicker and more efficient than previous techniques.

In one embodiment of the present invention, a computer-implemented method of counting predictor-target pairs for a decision tree model, the decision tree model based on data stored in a database, the data comprising a plurality of rows of data, at least one predictor and at least one target, the method comprises generating a bitmap for each tree node corresponding to a subset of data stored in a database system by intersecting a parent node bitmap and a bitmap of a predictor that satisfies a condition of the node, intersecting each split node bitmap with each predictor bitmap and with each target bitmap to form intersected bitmaps, and counting bits of each intersected bitmap to generate a count of per-node predictor-target pairs.

In one aspect of the present invention, each split node bitmap may be intersected with each predictor bitmap and with each target bitmap to form intersected bitmaps by intersecting each target bitmap with each split node bitmap to form a plurality of intermediate bitmaps and intersecting each intermediate bitmap with each predictor bitmap to form an intersected bitmap. The target bitmaps and the split node bitmaps may fit in a memory of a computer.

In one aspect of the present invention, each split node bitmap may be intersected with each predictor bitmap and with each target bitmap to form intersected bitmaps by, for each of a plurality of portions of the split node bitmaps, intersecting each target bitmap with each split node bitmap in the portion of the split node bitmaps to form a plurality of intermediate bitmaps and intersecting each intermediate bitmap with each predictor bitmap to form the intersected bitmaps. The target bitmaps and a portion of the split node bitmaps fit in a memory of a computer.

In one embodiment of the present invention, a computer-implemented method of generating a decision tree model comprises generating a plurality of bitmaps in the database system, the bitmaps generated from data stored in a database table in the database system, the database table comprising a plurality of rows of data, the plurality of bitmaps comprising a bitmap for each unique value of each predictor and target and indicating whether or not that unique value of each predictor and target is present in each row of the database table, intersecting each split node bitmap with each predictor bitmap and with each target bitmap to form intersected bitmaps, counting bits of each intersected bitmap to generate a count of predictor-target pairs, determining a splitter value for the data in the database table using the counts of the predictor-target pairs so as to split the data in the database table into a plurality of child nodes, each child node comprising a portion of the data in the database table, generating child bitmaps for the data in each child node, recursively generating a bitmap for each child node by intersecting a parent node bitmap and a bitmap of a predictor that satisfies a condition of the child node, intersecting each child node bitmap with each predictor bitmap and with each target bitmap to form intersected bitmaps, and counting bits of each intersected bitmap to generate a count of predictor-target pairs, whereby a decision tree model is formed.

In one aspect of the present invention, the bitmaps may be sorted by predictor and predictor value and target and target value. The bitmap that satisfies the condition of a particular node may be generated by, if the node is a root node, ORing each bitmap for each value of the predictor, to form a single bitmap for all values of the predictor, and, if the node is below the root node, generating a bitmap by ORing each bitmap for each value of the predictor that satisfies a condition of the node split, to form a single bitmap for all values of the predictor that satisfy the condition of the node split and ANDing the single bitmap with a bitmap for a node above the node. The bitmaps may be sorted by predictor and predictor value and target and target value.

BRIEF DESCRIPTION OF THE DRAWINGS

Further features and advantages of the invention can be ascertained from the following detailed description that is provided in connection with the drawings described below:

FIG. 5 is an example of an interface defining an SQL statement that invokes in-database generation of a decision tree model.

FIG. 6 is an example of the use of an SQL statement, such as that defined in FIG. 5, which invokes in-database generation of a decision tree model.

FIG. 7 is an example of a PL/SQL API through which an SQL statement, such as that shown in FIG. 6, is invoked.

DETAILED DESCRIPTION OF THE PREFERRED EMBODIMENTS

The present invention provides the capability to generate count tables that is quicker and more efficient than previous techniques. This capability is particularly useful when implemented in an SQL table function that encapsulates the concept of creating a decision tree based on a dataset that is the input from a query. This table function takes the input dataset along with some user-configurable information, and it directly produces a decision tree. The tree can then be used to understand the relationships in the data as well as to score new records.

The new table function is implemented inside the Relational Database Management System (RDBMS) by program code that supports this new SQL table function. Integrating the process of building decision trees inside the RDBMS enables leveraging of many of the database's strengths, such as memory management, parallel execution, and recursive execution. Providing a simple SQL interface via a specialized table function makes the integration of data mining into the database far simpler.

The SQL table function is an improvement over the use of standard SQL. It simplifies the query, but more importantly it simplifies the query optimization stages by making it explicit what type of operation is being processed. It enables the decision tree build process to leverage scalable, efficient, and robust database processing with a very simple interface.

Another advantage is that this method doesn't have to incur the expense, management, and security issues of moving the data to a specialized mining engine.

A decision tree is represented as a directed acyclic graph consisting of links and nodes. The structure defines a set of parent-child relationships. Parent nodes contain splitting rules that define the conditions under which a specific child is chosen. The rules consist of a splitting predictor, an operator, and one or more split values. For example, a rule might be IF AGE<=10 THEN Left Child ELSE Right Child. Another example is IF HAIR Color IN (Brown, Black) THEN Left Child ELSE Right Child. In addition, each node can contain ancillary information, such as a target value histogram, count of instances in the node, preferred target value at the node, or a ranked list of target values at the node.

Figure 1:
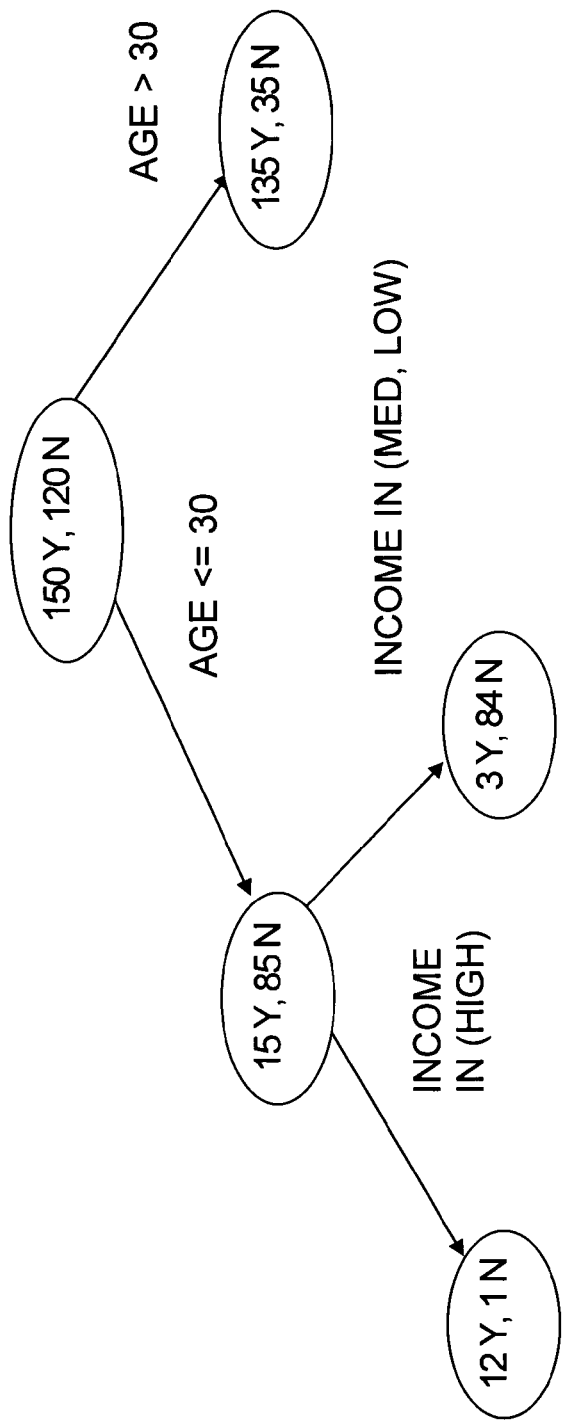
FIG. 1 illustrates an example of the application of a decision tree model.

An example of the application of a decision tree model is shown in FIG. 1. In this example, the decision tree models the response to a credit card promotion and may be used to provide a prediction as to the answer to the question "Will a customer respond to a credit card promotion?" In order to obtain the prediction, information relating to the particular customer may be used to traverse the tree by, at each node of the tree, using values of the customer's information to select a branch of the tree to follow. For example, the root of the tree, with no information about the customer, the prediction is that the customer is 56% (150 Y, 120 N) likely to respond to the promotion. If the customer's age is known, then if the age is greater than 30, the prediction is that the customer is 75% (135 Y, 35 N) likely to respond to the promotion. If the age is less than or equal to 30, the prediction is that the customer is 15% (15 Y, 85 N) likely to respond to the promotion. If the customer's income is also known, then the prediction can be further refined. If the customer's income is medium or low, then the prediction is that the customer is 3% (3 Y, 84 N) likely to respond to the promotion. If the customer's income is high, then the prediction is that the customer is 92% (12 Y, 1 N) likely to respond to the promotion. Thus, although it may not be worthwhile to target the credit card promotion to people under 30 in general; targeting the promotion to people under 30 with high incomes is worthwhile.

The present invention is particularly concerned with the generation of a decision tree model, such as that shown in FIG. 1. The present invention implements the functionality of generating a decision tree model in a database system. Preferably, the majority of the functionality is implemented via an internal SQL table function leveraging parallel recursion and bitmap indexes.

Figure 2:
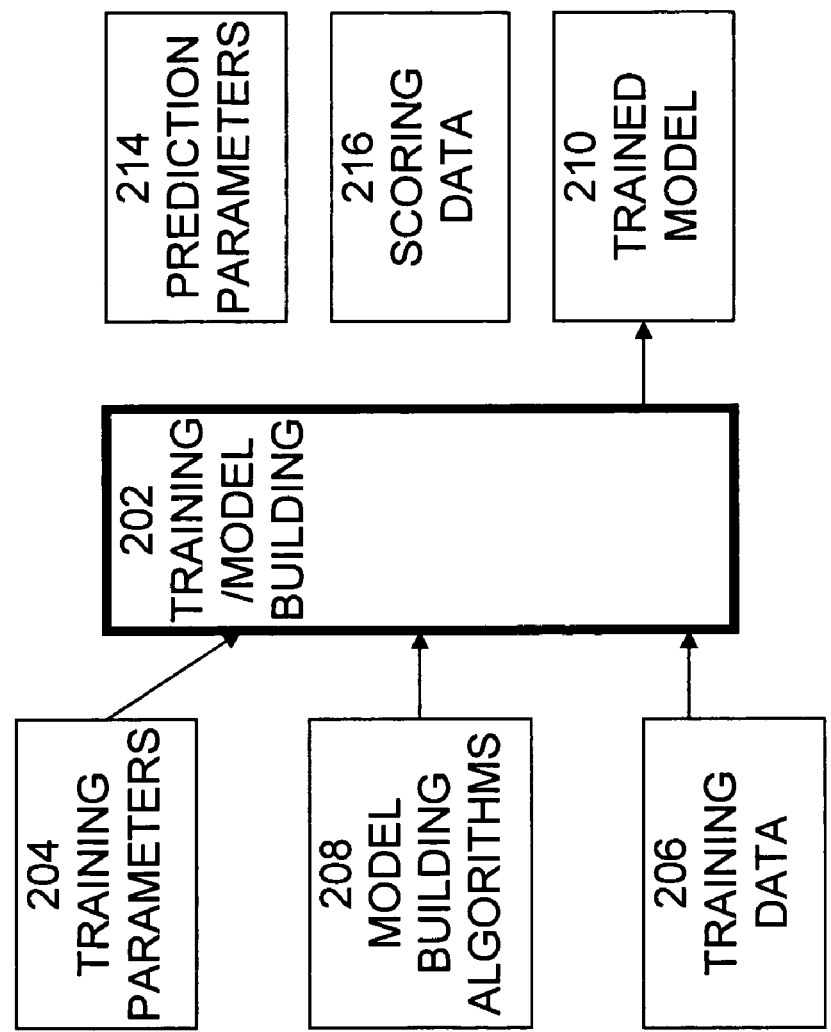
FIG. 2 is an exemplary data flow diagram of a process of building a decision tree model.

An exemplary data flow diagram of a process 200 of building a decision tree model, including building and scoring of models and generation of predictions/recommendations, is shown in FIG. 2. The training/model building step 202 involves generating the decision tree models that may be used to perform data mining predictions. The inputs to training/model building step 202 include training parameters 204, training data 206, and model building algorithms 208. Model building algorithms 208 include algorithms that process the training data 206 in order to actually build the models. In particular, model building algorithms 208 includes decision tree algorithms that are used to build data mining models that are based on decision trees. Training parameters 204 are parameters that are input to the data-mining model building algorithms to control how the algorithms build the models. Training data 206 is data that is input to the algorithms and which is used to actually build the models.

Training/model building step 202 invokes the data mining model building algorithms included in model building algorithms 208, initializes the algorithms using the training parameters 204, processes training data 206 using the algorithms to build the model, and generates trained model 210. Trained model 210 includes representations of the decision tree model. Trained model 210 may also be evaluated and adjusted in order to improve the quality, i.e. prediction accuracy, of the model. Trained model 210 is then encoded in an appropriate format and deployed for use in making.

In the present invention, the bulk of the model building algorithms 208 are implemented in the form of a new decision tree table function. The input to this function is training data 206 in the form of a set of rows containing predictors (like age, gender, etc.) and a categorical target (perhaps income_level). Each row contains all of the information for a particular case. In addition, the table function has other inputs, such as training parameters 204, to help guide the tree build process (e.g., max tree depth).

Figure 3:
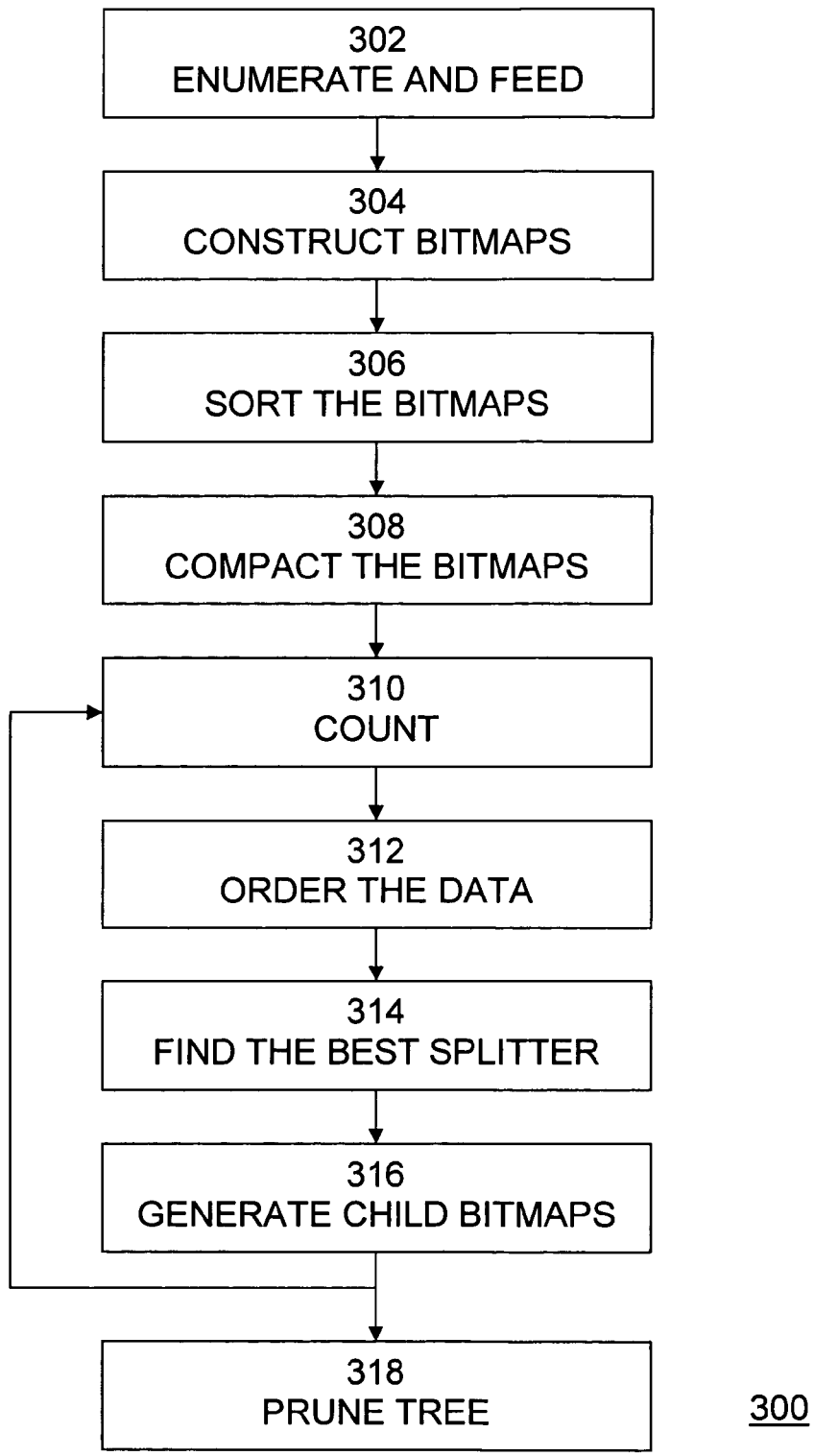
FIG. 3 is an exemplary flow diagram of a process of in-database building of a decision tree model.

A process 300 of in-database building of a decision tree model, such as that performed in step 202 of FIG. 2, is shown in FIG. 3. Process 300 begins with step 302, enumerate and feed, in which data is taken from normal rows in database tables and prepared for bitmap construction.

Figure 4:
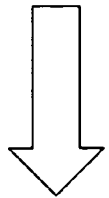
FIG. 4 is an exemplary illustration of construction of bitmaps from rows of data.

In step 304, the bitmaps are constructed. In order to construct the bitmaps, the incoming rows of data are numbered; then a bitmap is constructed for each unique value of each predictor and target. These bitmaps indicate whether or not that unique value of each predictor and target is present in that row. An example of this is shown in FIG. 4. As shown in FIG. 4, a plurality of rows 401-409, etc., include a plurality of values of predictors, such as age and income, as well as one or more targets, such as their response to a promotion. A bitmap 450 is constructed for age 1 that indicates whether or not the value 1 of the predictor age is present in each row 401-409, etc. Likewise, bitmaps 451-454 are constructed for other ages, and indicate whether or not their value of the predictor age is present in each row 401-409, etc. In addition, bitmaps for other predictors, such as income, etc., and for the target, such as response, are constructed.

In step 306, the bitmaps are sorted by predictor and predictor value and target and target value, which may improve performance of the decision tree generation process. In step 308, the sorted bitmaps are compacted, which also may improve performance of the decision tree generation process.

In step 310, once the compacted bitmaps are available, the counts of predictor-target pairs are generated. Preferably, this is done by intersecting a predictor bitmap with a target bitmap and counting the resulting bits. For example, the number of males with low income can be counted by intersecting the bitmaps for (gender, m) and (income_level, low) and counting the resulting bits—rows where both the predictor value and target value are present.

In step 312 the resulting training data is ordered. Preferably, the ordering depends upon the type of data being processed. For example, for numerical data, the data is preferably ordered by predictor value, while for categorical data, the data is preferably ordered by target density.

In step 314, the counts generated in step 310 are used to determine, initially, for the root node, which predictor is the best splitter and where the split should occur. The splitting process of step 314 takes the raw predictor-target counts (per node) and computes the best split, preferably using an impurity metric, such as the Gini impurity metric or the entropy impurity metric. For example, the Gini impurity metric may be defined as:

a. $1-SUM(p(j|t)^2)$ over all target classes j,
b. $p(j|t)=p(j,t)/p(t)=p(j,t)/SUM(p(j,t))$,
c. $p(j,t)=P(j)*Nj(t)/Nj$, where $P(j)$ is the (altered) prior probability of class j, $Nj(t)$ is the number of records of class j in node t, and $Nj$ is the number of records of class j in whole training set.

It is to be noted that splitting considerations vary with the type of data to be split. For example, for Numerical predictors, possible split points are along predictor value order (range splits). For categorical predictors with binary targets, possible split points lie along sorted order of target density (class1cnt/(class1cnt+class2cnt)). For categorical predictors with multi-class targets, it is preferably to use "twoing", that is, to arbitrarily group target classes into two "super" classes, use the regular approach for categoricals as above, and reassign targets to groups based on node dominance and repeat.

In step 316, the bitmaps for each child node generated by the split is generated. Once the best split is determined in step 314, the split information is fed to step 316, so that the node bitmaps for the next level can be generated. In addition, the best split information is sent to the pruning step 318 for further processing. The splitting step may also generate surrogate splits and target histograms, if desired.

Process 300 then loops back to step 310 in order to recursively perform steps 310-314 on each child node of the tree as the tree is split. The tree is built in a breadth-first manner. First, the root split is determined. Once this is done, the root's two child node bitmaps are generated and the best splits for those two children are determined. Once this is done, the process moves to the third level, and so on.

It is to be noted that step 312 is among the steps that are repeated. As described above, the ordering performed by this step depends upon the type of data being processed. For example, for numerical data, the data is preferably ordered by predictor value, while for categorical data, the data is preferably ordered by target density. Each split point along the sorted path is evaluated using an impurity metric. The best split point determined this way is preserved and compared to the previous best predictor split. When the process has finished with a set of nodes, it returns the best splits found.

In step 318 the tree is pruned by walking the decision tree and using a Minimum Description Length (MDL) based pruning approach to trim off leaves and branches. The pruned tree is then output from process 300. The main purpose of pruning is to take the built tree and prune so that it is general (not over-trained). In addition, during the pruning phase nodes are renumbered so that branch nodes start with 0 and are contiguous and extra splits and surrogates are eliminated. Inputs to the pruning process include rows of data that are outputs from the build process, using an encoding. These basic rows are Class total rows (node target histogram)
Main split
Surrogate splits
Special rows are:
Split predictor cardinality (for split cost)
Binning rows (to unmap bin values)
Predictor counts (for split cost)or
Target class cardinality (for node cost)

In order to produce a split for a given predictor of a given node and provide a measure of "goodness" for the split, it is preferred that a single process have all of the predictor-target counts for that predictor for that node. This is not strictly necessary, but reduces implementation complexity significantly.

An exemplary interface defining an SQL statement that invokes in-database generation of a decision tree model is shown in FIG. 5. The SQL statement defined by this interface is labeled ORA_FI_DECISION_TREE_HORIZ. An example of the use of this statement in SQL code is shown in FIG. 6. Typically, users would invoke the SQL code shown in FIG. 6 through a PL/SQL API, an example of which is shown in FIG. 7.

Figure 8:
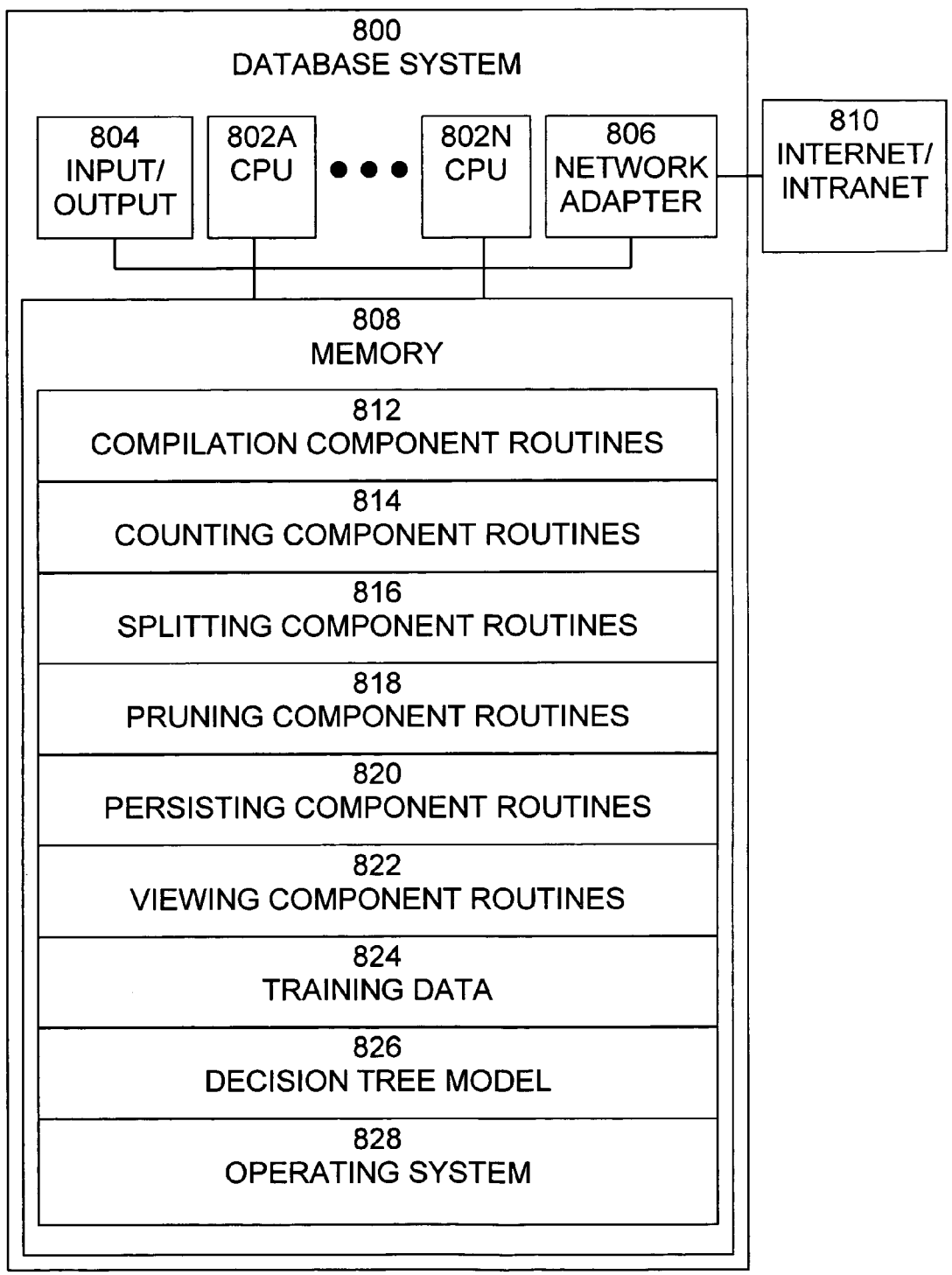
FIG. 8 is an exemplary block diagram of a database system, in which the present invention may be implemented.

An exemplary block diagram of a database system 800, in which the present invention may be implemented, is shown in FIG. 8. Database system 800 is typically a programmed general-purpose computer system, such as a personal computer, workstation, server system, and minicomputer or mainframe computer. Database system 800 includes one or more processors (CPUs) 802A-802N, input/output circuitry 804, network adapter 806, and memory 808. CPUs 802A-802N execute program instructions in order to carry out the functions of the present invention. Typically, CPUs 802A-802N are one or more microprocessors, such as an INTEL PENTIUM® processor. FIG. 8 illustrates an embodiment in which database system 800 is implemented as a single multi-processor computer system, in which multiple processors 802A-802N share system resources, such as memory 808, input/output circuitry 804, and network adapter 806. However, the present invention also contemplates embodiments in which database system 800 is implemented as a plurality of networked computer systems, which may be single-processor computer systems, multi-processor computer systems, or a mix thereof.

Input/output circuitry 804 provides the capability to input data to, or output data from, database system 800, For example, input/output circuitry may include input devices, such as keyboards, mice, touchpads, trackballs, scanners, etc., output devices, such as video adapters, monitors, printers, etc., and input/output devices, such as, modems, etc. Network adapter 806 interfaces database system 800 with Internet/intranet 810. Internet/intranet 800 may include one or more standard local area network (LAN) or wide area network (WAN), such as Ethernet, Token Ring, the Internet, or a private or proprietary LAN/WAN.

Memory 808 stores program instructions that are executed by, and data that are used and processed by, CPU 802 to perform the functions of database system 800. Memory 808 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 8, memory 808 includes compilation component routines 812, counting component routines 814, splitting component routines 816, pruning component routines 818, persisting component routines 820, viewing component routines 822, training data 824, decision tree model 826, and operating system 828. Compilation component routines 812 compile the SQL table function. Counting component routines 814 perform the enumerate and feed functions, in which data is taken from normal rows in database tables and prepared for bitmap construction, generate the bitmaps (predictor, target, and node), intersect the bitmaps, and count the results. Splitting component routines 816 find the best split and surrogates for each node. Pruning component routines 818 prune the resulting tree. Persisting component routines take the output of the table function and produce a data mining decision tree model 826. Viewing component routines 822 take a built model and return its details. Training data 824 is data used by the routines to generate the decision tree model. Operating system 828 provides overall system functionality.

As shown in FIG. 8, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

Figure 9:
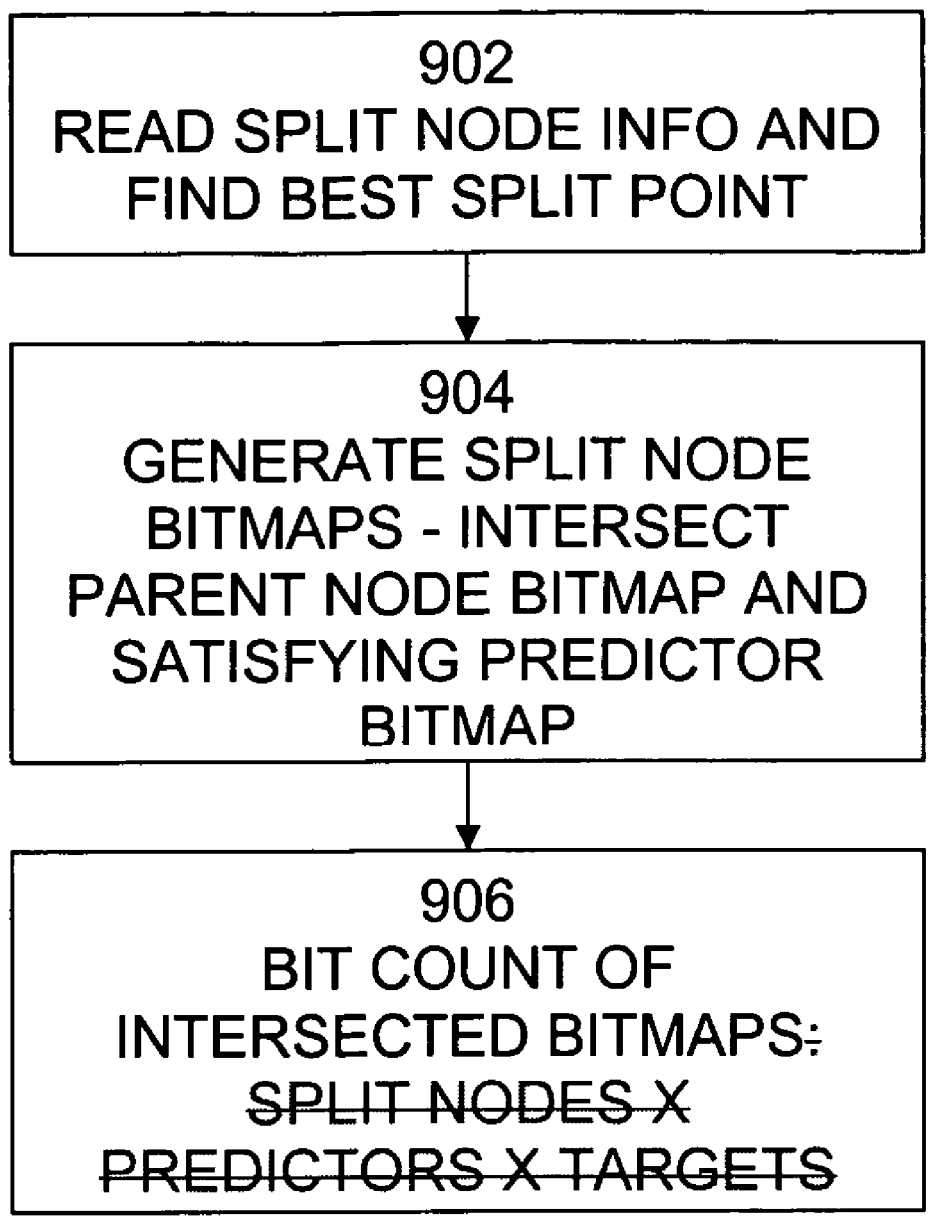
FIG. 9 is an exemplary flow diagram of additional processing relating to counting of predictor-target pairs and generation of count tables including these counts.

Additional processing 900 relating to counting of predictor-target pairs and generation of count tables including these counts are shown in FIG. 9. The present invention provides a bitmap-based technique for constructing the count tables. The count tables may be constructed in parallel. The present invention supports out-of-memory processing when not all the bitmaps and count tables can fit in memory. Process 900 begins with step 902, in which the split node information is read and the best split point is found. For example, for numerical data, a split from node-0 might be determined as:

(node-0, age <=35, node-1)
    (node-0, age >35, node-2), while for categorical data, a split might be determined as:
    (node-1, education in ('master', 'PhD'), node-5)
    (node-1, education in ('bachelor', 'else'), node-6).

In step 904, bitmaps for the split nodes are generated by intersecting the bitmap of the parent node and the bitmaps of the predictor that satisfy the condition of that node to generated the new split node bitmaps. For example, for numerical data, a bitmap may be generated as:

(node-0, age <=35, node-1)
    Bitmap of node-1: intersect the bitmap of node-0 with the result of ORing all <age> predictor bitmaps whose key is less than or equal to 35, while for categorical data, a bitmap may be generated as:
(node-1, education in ('master', 'PhD'), node-5)
   Bitmap of node-5: intersect the bitmap of node-1 with the result or ORing education['master']'s bitmap and education['PhD']'s bitmap In step 906, the bit count of the intersected bitmaps may be generated by counting the bits that are set in the resulting bitmap that was generated by intersecting the split node bitmaps with the predictor bitmaps and with the target bitmaps.

Thus, the count of a predictor-target pair may be computed by intersecting a predictor bitmap with a target bitmap and counting the number of bits set to 1 in the result. For example, the process can count the number of males with low income by intersecting the bitmaps for (gender, male) and (income_level, low) and counting the number of bits set to 1 in the result.

Once the processing is below the root node, it needs to compute these predictor-target counts with respect to the rows that fall into that node (by following the splitters in the tree). In order to do this node-local computation, the process will create node bitmaps by ORing and ANDing predictor bitmaps based on the tree splits. For example, if the root split was decided to be age <=20, then the process would produce a node bitmap by ORing all of the bitmaps for age where the value is <=20 and another node bitmap by ORing the values of age >20. At a lower level, the process would AND the age bitmap with the lower level splitter OR'd bitmap. Once the process has node bitmaps, it just needs to intersect these bitmaps with the predictor-target intersections to get the per node predictor-target counts.

Figure 10:
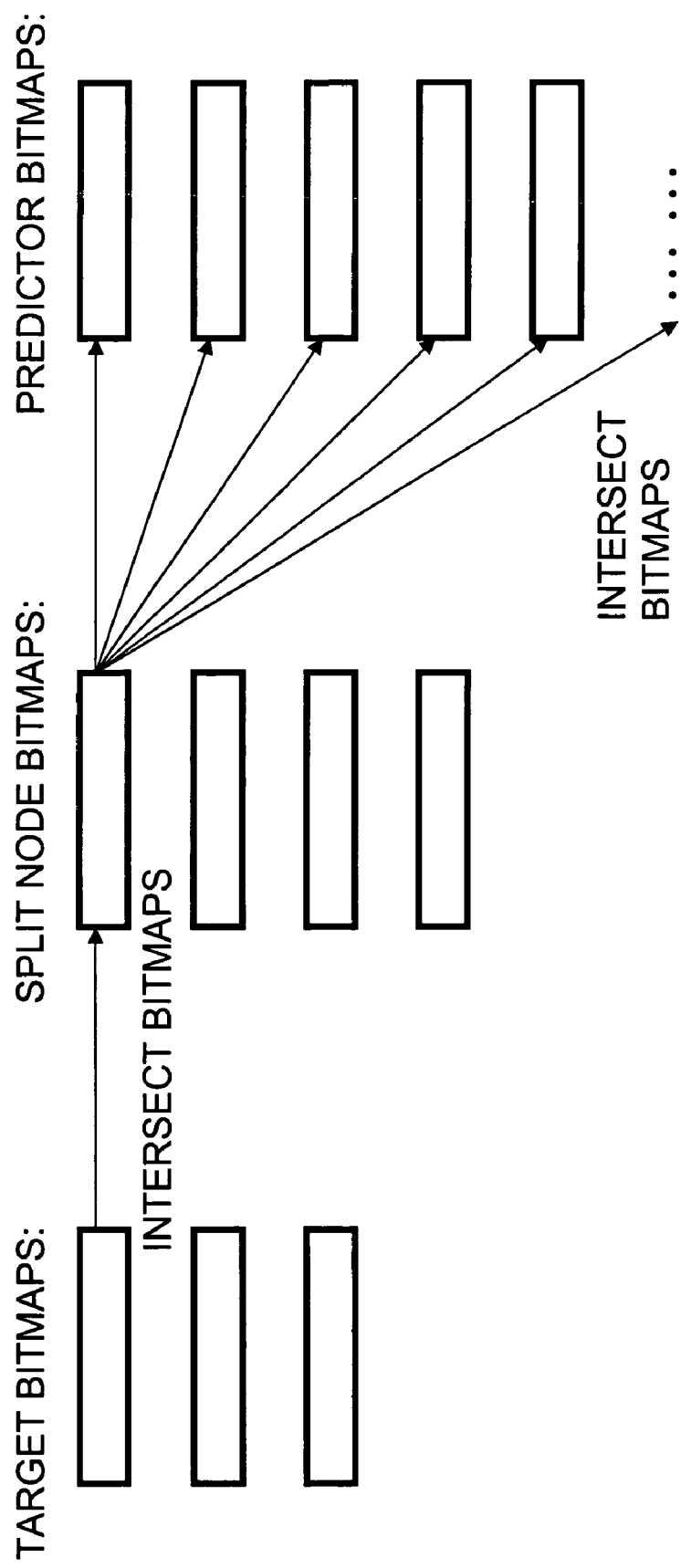
FIG. 10 illustrates an example of processing where all the bitmaps and count tables fit in memory.
Figure 11:
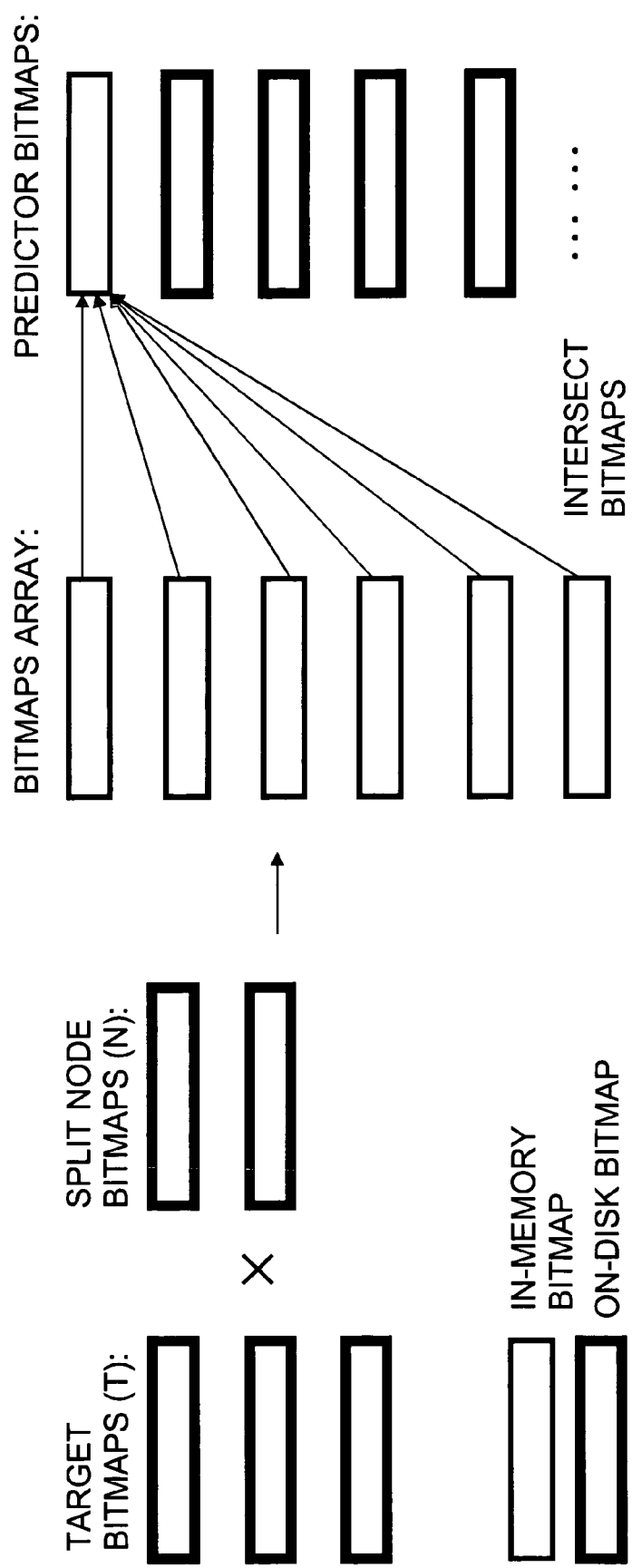
FIG. 11 illustrates an example where only a portion of the predictor bitmaps fit in memory, and all of the target and node bitmaps fit in memory

As mentioned above, the present invention supports out-of-memory processing when not all the bitmaps and count tables can fit in memory. An example of processing where all the bitmaps and count tables do fit in memory is shown in FIG. 10. In this case, it is simply a matter of intersecting the target bitmaps with the split node bitmaps, then intersecting that result with the predictor bitmaps. When the bitmaps and count tables are too large to fit in memory, additional processing is necessary. For example, in FIG. 11, a case where a certain portion of the bitmaps will fit in memory is shown. In this case, the number of bitmaps that will fit in memory is T*N bitmaps, where T the number of the target bitmaps and N is the number of the split node bitmaps. When the T target bitmaps are intersected with the N split node bitmaps, the result is a bitmap array including T*N bitmaps. Each of the T*N bitmaps is then intersected with each of the predictor bitmaps to yield the result.

Figure 12:
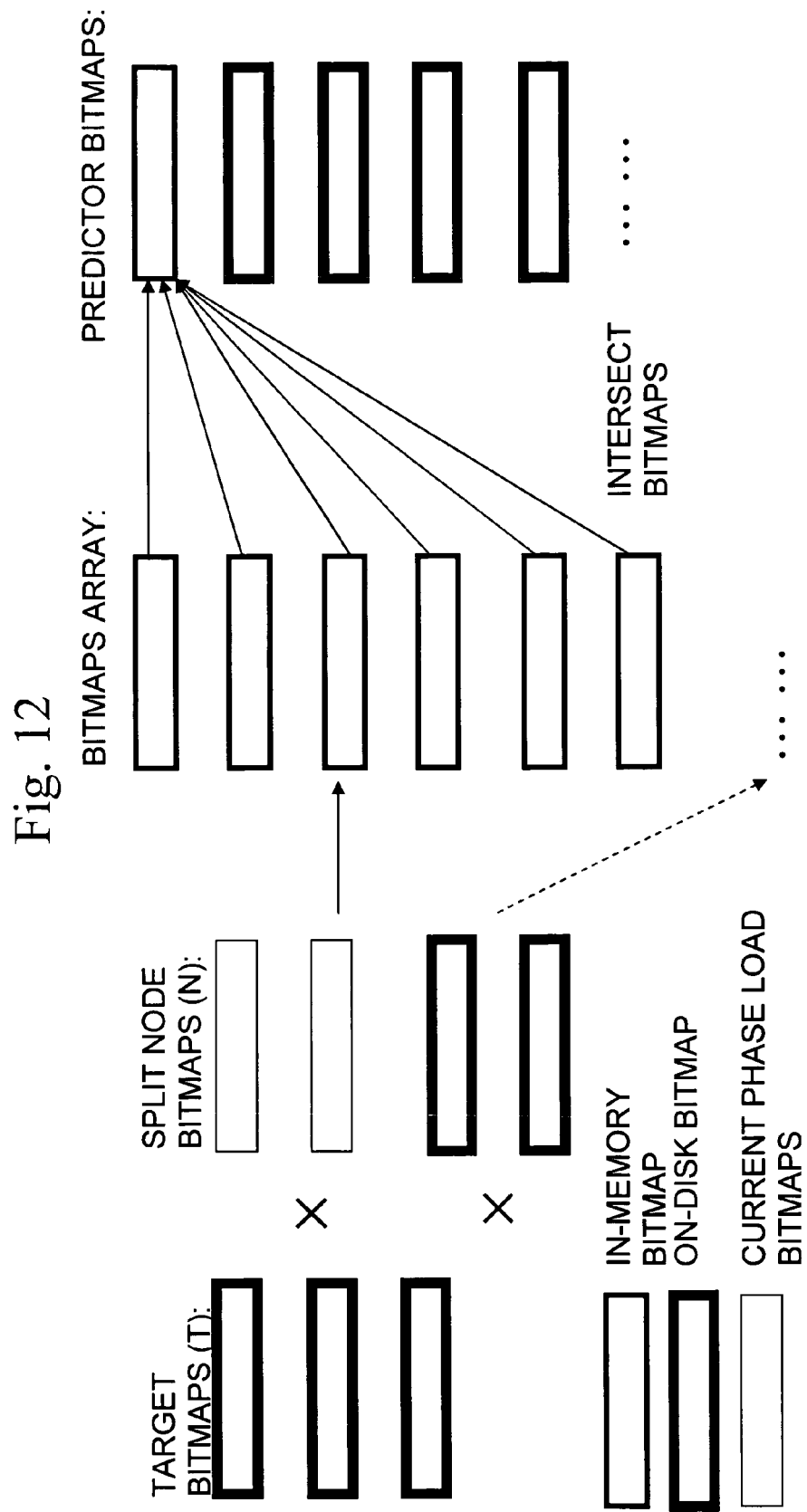
FIG. 12 illustrates an example where a portion of the predictor and node bitmaps do not fit in memory.

Then T*N bitmaps will not fit in memory, then processing similar to that shown in FIG. 12 may be used. In the example of FIG. 12, the T target bitmaps are intersected with a portion of the split node bitmaps (N/P) to generated T*N/P bitmaps, which will fit in memory. Each of the T*N/P bitmaps is then intersected with each of the predictor bitmaps to yield a partial result. The T target bitmaps are then intersected with the next set of N/P split node bitmaps, and so on.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method of generating a decision tree model comprising: generating a plurality of bitmaps in the database system, the bitmaps generated from data stored in a database table in the database system, the database table comprising a plurality of rows of data, the plurality of bitmaps comprising a bitmap for each unique value of each predictor and target and indicating whether or not that unique value of each predictor and target is present in each row of the database table; intersecting each split node bitmap with each predictor bitmap and with each target bitmap to form intersected bitmaps; counting bits of each intersected bitmap to generate a count of predictor-target pairs; determining a splitter value for the data in the database table using the counts of the predictor-target pairs so as to split the data in the database table into a plurality of child nodes, each child node comprising a portion of the data in the database table; generating child bitmaps for the data in each child node; recursively generating a split node bitmap for each child node by intersecting a parent node bitmap and a bitmap of a predictor that satisfies a condition of the child node; intersecting each child node bitmap with each predictor bitmap and with each target bitmap to form intersected bitmaps; and counting bits of each intersected bitmap to generate a count of predictor-target pairs; whereby a decision tree model is formed; wherein the bitmap of the predictor that satisfies the condition of the child node is generated by: if the node is a root node, generating a bitmap by ORing each bitmap for each value of the predictor that satisfies a condition of the node split, to form a single bitmap for all values of the predictor that satisfy the condition of the node split; and if the node is below the root node, generating a bitmap by ORing each bitmap for each value of the predictor that satisfies a condition of the node split, to form a single bitmap for all values of the predictor that satisfy the condition of the node split and ANDing the single bitmap with a bitmap for a node above the node.

2. The method of claim 1, wherein each split node bitmap is intersected with each predictor bitmap and with each target bitmap to form intersected bitmaps by: intersecting each target bitmap with each split node bitmap to form a plurality of intermediate bitmaps; and intersecting each intermediate bitmap with each predictor bitmap to form an intersected bitmap.

3. The method of claim 2, wherein the target bitmaps and the split node bitmaps fit in a memory of a computer.

4. The method of claim 1, wherein each split node bitmap is intersected with each predictor bitmap and with each target bitmap to form intersected bitmaps by: for each of a plurality of portions of the split node bitmaps: intersecting each target bitmap with each split node bitmap in the portion of the split node bitmaps to form a plurality of intermediate bitmaps; and intersecting each intermediate bitmap with each predictor bitmap to form the intersected bitmaps.

5. The method of claim 4, wherein the target bitmaps and a portion of the split node bitmaps fit in a memory of a computer.

6. The method of claim 1, wherein the bitmaps are sorted by predictor and predictor value and target and target value.

7. A database system for generating a decision tree model comprising: a processor operable to execute computer program instructions; a memory operable to store computer program instructions executable by the processor; and computer program instructions stored in the memory and executable to perform the steps of: generating a plurality of bitmaps in the database system, the bitmaps generated from data stored in a database table in the database system, the database table comprising a plurality of rows of data, the plurality of bitmaps comprising a bitmap for each unique value of each predictor and target and indicating whether or not that unique value of each predictor and target is present in each row of the database table; intersecting each split node bitmap with each predictor bitmap and with each target bitmap to form intersected bitmaps; counting bits of each intersected bitmap to generate a count of predictor-target pairs; determining a splitter value for the data in the database table using the counts of the predictor-target pairs so as to split the data in the database table into a plurality of child nodes, each child node comprising a portion of the data in the database table; generating child bitmaps for the data in each child node; recursively generating a bitmap for each child node by intersecting a parent node bitmap and a bitmap of a predictor that satisfies a condition of the child node; intersecting each child node bitmap with each predictor bitmap and with each target bitmap to form intersected bitmaps; and counting bits of each intersected bitmap to generate a count of predictor-target pairs; whereby a decision tree model is formed, wherein the bitmap predictor that satisfies the condition of the child node is generated by: if the node is a root node, generating a bitmap by ORing each bitmap for each value of the predictor that satisfies a condition of the node split, to form a single bitmap for all values of the predictor that satisfy the condition of the node split; and if the node is below the root node, generating a bitmap by ORing each bitmap for each value of the predictor that satisfies a condition of the node split, to form a single bitmap for all values of the predictor that satisfy the condition of the node split and ANDing the single bitmap with a bitmap for a node above the node.

8. The system of claim 7, wherein each split node bitmap is intersected with each predictor bitmap and with each target bitmap to form intersected bitmaps by: intersecting each target bitmap with each split node bitmap to form a plurality of intermediate bitmaps; and intersecting each intermediate bitmap with each predictor bitmap to form an intersected bitmap.

9. The system of claim 8, wherein the target bitmaps and the split node bitmaps fit in a memory of a computer.

10. The system of claim 7, wherein each split node bitmap is intersected with each predictor bitmap and with each target bitmap to form intersected bitmaps by: for each of a plurality of portions of the split node bitmaps: intersecting each target bitmap with each split node bitmap in the portion of the split node bitmaps to form a plurality of intermediate bitmaps; and intersecting each intermediate bitmap with each predictor bitmap to form the intersected bitmaps.

11. The system of claim 10, wherein the target bitmaps and a portion of the split node bitmaps fit in a memory of a computer.

12. The system of claim 7, wherein the bitmaps are sorted by predictor and predictor value and target and target value.

13. A computer program product for generating a decision tree model in a database system, comprising: a computer readable storage medium; computer program instructions, recorded on the computer readable storage medium, executable by a processor, for performing the steps of generating a plurality of bitmaps in the database system, the bitmaps generated from data stored in a database table in the database system, the database table comprising a plurality of rows of data, the plurality of bitmaps comprising a bitmap for each unique value of each predictor and target and indicating whether or not that unique value of each predictor and target is present in each row of the database table; intersecting each split node bitmap with each predictor bitmap and with each target bitmap to form intersected bitmaps; counting bits of each intersected bitmap to generate a count of predictor-target pairs; determining a splitter value for the data in the database table using the counts of the predictor-target pairs so as to split the data in the database table into a plurality of child nodes, each child node comprising a portion of the data in the database table; generating child bitmaps for the data in each child node; recursively generating a bitmap for each child node by intersecting a parent node bitmap and a bitmap of a predictor that satisfies a condition of the child node; intersecting each child node bitmap with each predictor bitmap and with each target bitmap to form intersected bitmaps; and counting bits of each intersected bitmap to generate a count of predictor-target pairs; whereby a decision tree model is formed; wherein the bitmap of the predictor that satisfies the condition of the node is generated by: if the node is a root node, generating a bitmap by ORing each bitmap for each value of the predictor that satisfies a condition of the node Split, to form a single bitmap for all values of the predictor that satisfy the condition of the node split; and if the node is below the root node, generating a bitmap by ORing each bitmap for each value of the predictor that satisfies a condition of the node split, to form a single bitmap for all values of the predictor that satisfy the condition of the node split and ANDing the single bitmap with a bitmap for a node above the node.

14. The computer program product of claim 13, wherein the bitmaps are sorted by predictor and predictor value and target and target value.

15. The computer program product of claim 13, wherein each split node bitmap is intersected with each predictor bitmap and with each target bitmap to form intersected bitmaps by: intersecting each target bitmap with each split node bitmap to form a plurality of intermediate bitmaps; and intersecting each intermediate bitmap with each predictor bitmap to form an intersected bitmap.

16. The computer program product of claim 15, wherein the target bitmaps and the split node bitmaps fit in a memory of a computer.

17. The computer program product of claim 15, wherein the target bitmaps and a portion of the split node bitmaps fit in a memory of a computer.

* * * * *

UNITED STATES PATENT AND TRADEMARK OFFICE
CERTIFICATE OF CORRECTION

PATENT NO. : 7,571,159 B2  Page 1 of 1
APPLICATION NO. : 11/344193
DATED : August 4, 2009
INVENTOR(S) : Shiby Thomas et al.

It is certified that error appears in the above-identified patent and that said Letters Patent is hereby corrected as shown below:

In the drawings, Figure 9, at 906, delete ": ~~SPLIT NODES X PREDICTORS X TARGETS~~".

In column 3, line 45, after "memory" insert -- . --.

In column 7, line 34, delete "800," and insert -- 800. --, therefor.

In column 7, line 40, delete "800" and insert -- 810 --, therefor.

In column 9, line 5, after "bitmap" insert -- . --.

In column 9, line 48, delete "Then" and insert -- When --, therefor.

In column 12, line 33, in claim 13, delete "Split," and insert -- split, --, therefor.

Signed and Sealed this

Twenty-ninth Day of June, 2010

David J. Kappos
*Director of the United States Patent and Trademark Office*